ated Sept. 11, 1962

3,053,853
A PROCESS FOR PREPARING THIOPHENE TETRACARBOXYLIC ACID

Robert D. Vest, Wilmington, Del., assignor to E. I. du Pont de Nemours and Company, Wilmington, Del., a corporation of Delaware
No Drawing. Filed May 31, 1961, Ser. No. 113,654
4 Claims. (Cl. 260—332.2)

This invention relates to a novel process for the preparation of thiophene tetracarboxylic acid.

Polycarboxylic acids are widely used in the preparation of plasticizers, polymers and other products. One of these acids, thiophene tetracarboxylic acid, has recently been made available by the hydrolysis of tetracyanothiophene, as disclosed in assignee's copending application S.N. 99,681, filed April 19, 1961. The acid is particularly useful as an inhibitor for vinyl monomers and for the preparation of high-melting polymers, especially polyimides.

It has now been found that thiophene tetracarboxylic acid is obtained by the reaction of aqueous mineral acid at elevated temperature with 1,4-dithia-2,3,5,6-tetracyanocyclohexa-2,5-diene. (The latter compound can also be named as tetracyano-1,4-dithiin.) This novel reaction can be represented as follows:

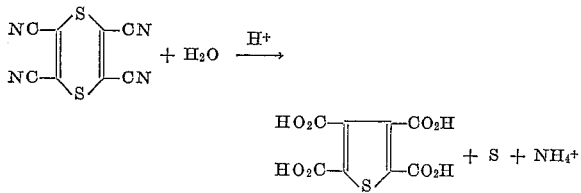

The result of this reaction is highly unexpected in that hydrolysis and loss of sulfur take place simultaneously to yield the thiophene derivative instead of the dithiin derivative.

In the reaction, the temperature should be at least 80° C. since at lower temperatures the major product is the diimide of the 1,4-dithiin. To avoid decomposition of the product acid the temperature should be less than 200° C. In general, the temperature for optimum rates of reaction is between 90° C. and 175° C. and preferably between 90° C. and 150° C.

The time involved depends upon the specific temperature and acid as well as acid concentration. In general, the time required is at least one hour and is usually in the range of two hours to about three days.

The acid employed is a mineral acid which contains 25–85% by weight of water and preferably about 65% water. Aqueous hydrochloric acid is preferred although other mineral acids, e.g., phosphoric acid, are operable. The amount of mineral acid employed is not critical and will depend upon the particular acid and its concentration. Generally, when the acid contains about 65% water, the weight ratio of aqueous acid to the dithiin will be at least 2:1, and preferably from 10:1 to 100:1.

The reaction pressure is not critical. The reaction is conveniently carried out at atmospheric pressure, although reaction time can generally be reduced when superatmospheric pressure and elevated temperatures are employed.

Thiophene tetracarboxylic acid can be separated from the product mixture by conventional prior art techniques. For example, thiophene tetracarboxylic acid of sufficient purity for most purposes is obtained by filtering the hot product suspension to remove sulfur, cooling the filtrate to crystallize the product acid, and filtering the cooled suspension to isolate the crystals. If it is desired, the thiophene tetracarboxylic acid can be further purified, e.g., by passing an aqueous solution of the crystalline product through a bed of cation-exchange resin. The use of the cation-exchange resin provides a practical method, not only for separating thiophene tetracarboxylic acid from contaminants which crystallize therewith, but for regenerating the acid from its own ammonium salts.

The following examples further illustrate the preparation of thiophene tetracarboxylic acid from tetracyano-1,4-dithiin. Example I-B constitutes a preferred embodiment of the invention.

Example I-A

Tetracyano-1,4-dithiin was prepared as follows: To a stirred and cooled (0–10° C.) suspension of 22.2 parts of 1,2-dicyano-1,2-disodiothioethylene [obtained from disodiothioethylene the reaction product of sodium cyanide and carbon disulfide as described by Bahr and Schleitzer, Ber. 90, 438 (1957)] in 350 parts of dimethoxyethane, was added 17.4 parts of dichloromaleonitrile. After 72 hours at room temperature, the solids were removed by filtration and the filtrate evaporated to dryness. The residue was extracted by warm benzene and later recrystallized from hot benzene to give 1,4-dithia-2,3,5,6-tetracyanocyclohexa-2,5-diene, M.P. 207–208° C.

Example I-B

A suspension of 0.5 g. of the tetracyano-1,4-dithiin prepared in Example I-A in 25 ml. concentrated hydrochloric acid (approximately 35% acid) was stirred and heated under reflux for two days. During this period, sulfur was observed to collect in the cold part of the condenser. The suspension was filtered hot, removing 0.070 g. (95%) of sulfur and the filtrate cooled. The tan solid (0.49 g., 83%) which crystallized was isolated by filtration and identified as thiophene tetracarboxylic acid by a comparison of its infrared spectrum with that of an independently prepared sample. The crude product melted at 256–264° C. (with dec.).

The infrared spectrum of thiophene tetracarboxylic acid is characterized by absorptions at 3.12, 5.82, 6.59–6.70, 7.92, 8.21, 8.85, and 12.4$\mu$ (as major features).

Example II

A suspension of 5.0 g. of tetracyano-1,4-dithiin in 200 ml. concentrated hydrochloric acid was stirred and heated under reflux for three days. During the course of the reaction, small samples were removed by filtration and examined by infrared techniques. During the first three hours, the tetracyanodithiin was converted to an intermediate, dithiin bisimide:

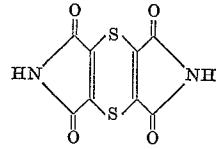

which reacted further to form, after three days, 4.26 g. (72%) of thiophene tetracarboxylic acid, M.P. 265–270° C.

Example III

A mixture of 5.0 g. of tetracyano-1,4-dithiin and 25 ml. concentrated hydrochloric acid was heated to 140° C. for two hours in a sealed tube. Thiophene tetracarboxylic acid, M.P. 263–267° C. (dec.) was obtained from the reaction product.

Thiophene tetracarboxylic acid is useful for the preparation of polyimides, e.g., by the general process of Brit. 570,858, U.S. 2,710,853 and U.S. 2,731,447. The polyimides are high-melting products of interest in the preparation of fibers and molded objects.

Also, thiophene tetracarboxylic acid is an inhibitor of vinyl polymerization and is particularly useful to stabilize solutions of monomers. It can be removed by a water wash from water-insoluble monomers prior to polymerization. This inhibition is illustrated as follows: Three separate 7-ml. portions of a stock solution of vinyl acetate and initiator (30 ml. vinyl acetate and 0.006 g. of α,α′,-azodiisobutyronitrile) with one as a control, the second with 0.01 g. and the third 0.02 g. of thiophene tetracarboxylic acid, were heated for 1.25 hours at 70–75° C. The control yielded 3 g. of polymer while the second and third portions yielded 0.36 g. and 0.3 g. of polymer, respectively.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing thiophene tetracarboxylic acid which comprises contacting an aqueous mineral acid comprising 25–85% water with tetracyano-1,4-dithiin at a temperature of from 80° C. up to about 200° C.

2. The process of claim 1 wherein the aqueous mineral acid is hydrochloric acid.

3. The process of claim 1 wherein the temperature is between 90° C. and 150° C.

4. The process of preparing thiophene tetracarboxylic acid which comprises contacting aqueous hydrochloric acid comprising about 65% water with tetracyano-1,4-dithiin for at least one hour at a temperature between 90° C. and 150° C.

No references cited.